(12) United States Patent
Hahnlen

(10) Patent No.: US 11,278,985 B2
(45) Date of Patent: *Mar. 22, 2022

(54) UAM TRANSITION FOR FUSION WELDING OF DISSIMILAR METAL PARTS

(71) Applicant: Honda Motor Co., Ltd., Tokyo (JP)

(72) Inventor: Ryan M. Hahnlen, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/124,859

(22) Filed: Dec. 17, 2020

(65) Prior Publication Data

US 2021/0101226 A1 Apr. 8, 2021

Related U.S. Application Data

(63) Continuation of application No. 15/885,895, filed on Feb. 1, 2018, now Pat. No. 10,870,166.

(51) Int. Cl.
*B23K 20/10* (2006.01)
*B32B 15/01* (2006.01)
(Continued)

(52) U.S. Cl.
CPC .............. *B23K 20/10* (2013.01); *B23K 11/11* (2013.01); *B23K 11/20* (2013.01); *B32B 15/012* (2013.01);
(Continued)

(58) Field of Classification Search
None
See application file for complete search history.

(56) References Cited

U.S. PATENT DOCUMENTS

| 2,481,614 A | 9/1949 | Thomas |
| 3,663,356 A | 5/1972 | Li |

(Continued)

FOREIGN PATENT DOCUMENTS

| CN | 102107535 | 6/2011 |
| CN | 102672328 | 9/2012 |

(Continued)

OTHER PUBLICATIONS

Davies et al., "Characterizing Al Tailor-Welded Blanks for Automotive Applications", JOM, Nov. 1999, 5 pages.
(Continued)

*Primary Examiner* — Daniel J. Schleis
(74) *Attorney, Agent, or Firm* — Rankin, Hill & Clark LLP

(57) ABSTRACT

Welded assemblies and related methods of making the welded assemblies include a first component of a first metal material, a second component of a second metal material that is different from the first metal material, and a transition material including one or more of a high entropy alloy, a pure element, and an alloy that is not a high entropy alloy, and that is arranged between and contacting the first component and the second component. An ultrasonic weld joins the transition material to the first component, and a fusion weld joins the first component to the second component. The fusion weld contact the first component, the second component, and the transition material. The amount or level of one or more of galvanic corrosion, intermetallic compounds, and solidification cracking in the fusion weld is less than if the first component was fusion welded directly to the second component.

20 Claims, 4 Drawing Sheets

(51) Int. Cl.
   *B23K 11/20* (2006.01)
   *B32B 15/20* (2006.01)
   *B23K 11/11* (2006.01)
   *B32B 15/18* (2006.01)

(52) U.S. Cl.
   CPC .............. *B32B 15/18* (2013.01); *B32B 15/20* (2013.01); *Y10T 428/12757* (2015.01)

(56) References Cited

U.S. PATENT DOCUMENTS

| | | | |
|---|---|---|---|
| 4,890,784 | A | 1/1990 | Bampton |
| 5,322,205 | A | 6/1994 | Kato et al. |
| 5,599,467 | A | 2/1997 | Okabe et al. |
| 6,173,886 | B1 | 1/2001 | McCay et al. |
| 6,558,491 | B2 | 5/2003 | Jahn et al. |
| 6,833,199 | B2 | 12/2004 | Fujita et al. |
| 6,988,757 | B2 | 1/2006 | McLaren et al. |
| 7,115,324 | B1 | 10/2006 | Stol et al. |
| 7,829,165 | B2 | 11/2010 | Grandominico et al. |
| 8,020,749 | B2 | 9/2011 | Kobayashi et al. |
| 8,082,966 | B2 | 12/2011 | Short |
| 8,221,899 | B2 | 7/2012 | Takeda et al. |
| 8,262,968 | B2 | 9/2012 | Smith et al. |
| 8,337,998 | B2 | 12/2012 | Takeda et al. |
| 8,487,206 | B2 | 7/2013 | Urushihara et al. |
| 8,640,320 | B2 | 2/2014 | Carsley et al. |
| 8,647,453 | B2 | 2/2014 | Doorbar |
| 9,101,979 | B2 | 8/2015 | Hofmann et al. |
| 9,126,632 | B2 | 9/2015 | Ono |
| 9,174,298 | B2 | 11/2015 | Kasukawa et al. |
| 9,446,475 | B2 | 9/2016 | Norfolk et al. |
| 9,564,385 | B2 | 2/2017 | Schmit et al. |
| 10,843,741 | B2 | 11/2020 | Nakamoto et al. |
| 10,870,166 | B2 | 12/2020 | Hahnlen |
| 10,894,566 | B2 | 1/2021 | Lang et al. |
| 2002/0112435 | A1 | 8/2002 | Hailman |
| 2006/0165884 | A1 | 7/2006 | White et al. |
| 2009/0011269 | A1 | 1/2009 | Urushihara et al. |
| 2009/0117366 | A1 | 5/2009 | Honma |
| 2010/0141009 | A1 | 6/2010 | Kirch et al. |
| 2012/0183802 | A1 | 7/2012 | Bruck |
| 2013/0309520 | A1 | 11/2013 | Lang et al. |
| 2014/0193659 | A1 | 7/2014 | Lanzerath et al. |
| 2015/0050453 | A1 | 2/2015 | Carson, Jr. et al. |
| 2015/0217395 | A1 | 8/2015 | Spinella et al. |
| 2015/0352661 | A1 | 12/2015 | Karlen et al. |
| 2016/0028216 | A1 | 1/2016 | Pal |
| 2016/0045978 | A1 | 2/2016 | Wang |
| 2016/0091125 | A1 | 3/2016 | Lockwood et al. |
| 2016/0101599 | A1 | 4/2016 | Kaiser et al. |
| 2016/0200074 | A1 | 7/2016 | Lang et al. |
| 2017/0008333 | A1 | 1/2017 | Mason et al. |
| 2017/0057005 | A1 | 3/2017 | Wisniewski |
| 2017/0286821 | A1 | 10/2017 | Nardi et al. |
| 2017/0287685 | A1 | 10/2017 | Ferrasse et al. |
| 2018/0058327 | A1 | 3/2018 | Tajiri et al. |
| 2018/0058473 | A1 | 3/2018 | Kenworthy et al. |
| 2018/0222150 | A1 | 8/2018 | Petrucci et al. |
| 2018/0346034 | A1 | 12/2018 | Sheldon et al. |
| 2018/0361481 | A1 | 12/2018 | Tenhaeff |
| 2019/0033719 | A1 | 1/2019 | Cole |
| 2019/0047031 | A1 | 2/2019 | Hahnlen et al. |
| 2019/0061032 | A1 | 2/2019 | Wolcott |
| 2019/0061042 | A1 | 2/2019 | Hahnlen et al. |
| 2020/0139480 | A1 | 5/2020 | Sigler et al. |
| 2021/0173475 | A1 | 6/2021 | Qian et al. |
| 2021/0197457 | A1 | 7/2021 | Broach et al. |
| 2021/0276126 | A1 | 9/2021 | Chen et al. |
| 2021/0309304 | A1 | 10/2021 | Mueller et al. |

FOREIGN PATENT DOCUMENTS

| | | |
|---|---|---|
| CN | 103551721 | 2/2014 |
| CN | 104400204 | 3/2015 |
| CN | 105689906 | 6/2016 |
| EP | 0955121 | 11/1999 |
| EP | 2754546 | 7/2014 |
| WO | 2015166149 | 11/2015 |

OTHER PUBLICATIONS

Patel et al., "Ultrasonic Spot Welding of Aluminum to High-Strength Low-Alloy Steel: Microstructure, Tensile and Fatigue Properties", Metallurgical and Materials Transactions A, Mar. 2014, 13 pages.

Office Action of U.S. Appl. No. 16/058,440 dated Jan. 11, 2021, 29 pages.

Office Action of U.S. Appl. No. 16/058,440 dated May 14, 2021, 13 pages.

"Driving higher strength and lower weights" Fabrisonic, http://fabrisonic.com/metal-matrix-composites/ (Accessed Sep. 3, 2015).

Friel et al. "Ultrasonic Additive Manufacturing—a hybrid production process for novel functional products" SciVerse Science Direct, 35-40, 2013.

Graff. "Ultrasonic Additive Manufacturing", ASM Handbook: vol. 6A, Welding Fundamentals and Processes, 2011, 22 pages.

Ryabov, "Fusion Welding of Aluminum to Steel", Foreign Technology Dvision Wright-Patterson Air Force Base, Ohio, Jul. 9, 1973, 236 pages.

"Ultrasonic Additive Manufacturing presentation at ASM Symposium" https://ewi.org/ultrasonic-additive-manufacturing-presentation-at-asm-symposium/. Printed Aug. 28, 2017.

Wolcott et al. "Characterisation of Al—Ti dissimilar material joints fabricated using ultrasonic additive manufacturing" Sci & Tech of Welding & Joining, 2016, vol. 21, pp. 114-123.

Wolcott et al. "Ultrasonic additive manufacturing", Additive Manufacturing Handbook—Product Development for the Defense Industry, 2017, Chapter 17, pp. 275-313.

Yang "Fabrication of Long-Fiber-Reinforced Metal Matrix Composites Using Ultrasonic Consolidation" Utah State University, 2008.

Office Action of U.S. Appl. No. 16/058,440 dated Oct. 6, 2021, 16 pages.

Office Action of U.S. Appl. No. 16/737,234 dated Nov. 10, 2021, 41 pages.

Office Action of U.S. Appl. No. 17/018,289 dated Dec. 16, 2021, 42 pages.

UAM TRANSITION FOR FUSION WELDING OF DISSIMILAR METAL PARTS

BACKGROUND

Joining of dissimilar metals in the automotive industry is typically accomplished through the use of adhesives or mechanical fasteners. However, mechanical fasteners require added weight, cost, parts, and assembly time. Adhesives require specialized equipment, increased takt time, and a separate thermal cycle to cure the adhesive to full strength. Changing to a different joining process often requires new infrastructure in factory assembly lines, costing additional capital investment, line re-design, and personnel training.

Fusion welding is also often used to join two metal pieces. However, a barrier to fusion welding dissimilar metal materials is the formation of intermetallic compounds (IMCs), as well as solidification or "hot" cracking induced by different solidification temperature ranges of different molten compounds in the weld pool and galvanic corrosion. IMCs are often brittle and can result in weak joint strength, while hot cracking creates fractures in the weld pool as the weld cools, and galvanic corrosion can result in joint failure as one of more of the base metals erode due to exposure to an electrolytic solution while in electrical contact with each other.

One method of averting the problems of formation of IMCs and solidification cracking is through the addition of a filler material that dilutes the weld pool, preferentially forms acceptable compounds, or provides physical separation of the incompatible elements in the weld pool. Filler material is typically preplaced in a joint prior to welding or added to the weld pool during welding as in Shielded Metal Arc Welding (SMAW), Gas Metal Arc Welding (GMAW) and some instances of Gas Tungsten Arc Welding (GTAW). Galvanic corrosion can be prevented by accommodating the change in electronegativity between the base metals by incrementally using intermediate materials that have electronegativity between that of the two base metals. Additionally, by placing additional filler material between the base metals, physical separation makes simultaneous contact by an electrolytic solution less likely, thereby preventing galvanic corrosion.

BRIEF DESCRIPTION

According to one aspect, a welded assembly comprises a first component including a first metal material, a second component including a second metal material that is different from the first metal material, a transition material arranged between and contacting the first component and the second component. The transition material comprises one or more of a high entropy alloy, a pure element, and an alloy that is not a high entropy alloy. The assembly also includes an ultrasonic weld joining the transition material to the first component, and a fusion weld joining the first component to the second component. The fusion weld contacts the first component, the second component, and the transition material. The amount or level of one or more of galvanic corrosion, intermetallic compounds, and solidification cracking in the fusion weld is less than if the first component was fusion welded directly to the second component without having the transition material arranged between and contacting the first component and the second component.

According to another aspect, a method of making a welded assembly comprises providing a transition material ultrasonically welded to a first component, arranging the transition material between the first component and a second component such that the transition material contacts the second component, and joining the first component to the second component by forming a fusion weld between the first component and the second component. The first component comprises a first metal material, the second component comprises a second metal material that is different from the first metal material, and the transition material comprises one or more of a high entropy alloy, a pure element, and an alloy that is not a high entropy alloy. The fusion weld contacts the first component, the second component, and the transition material. Upon joining, the amount or level of one or more of galvanic corrosion, the formation of intermetallic compounds, and solidification cracking in the fusion weld is reduced as compared to if the first component was joined directly to the second component without having the transition material arranged between the first component and the second component.

DETAILED DESCRIPTION

Figure 1:
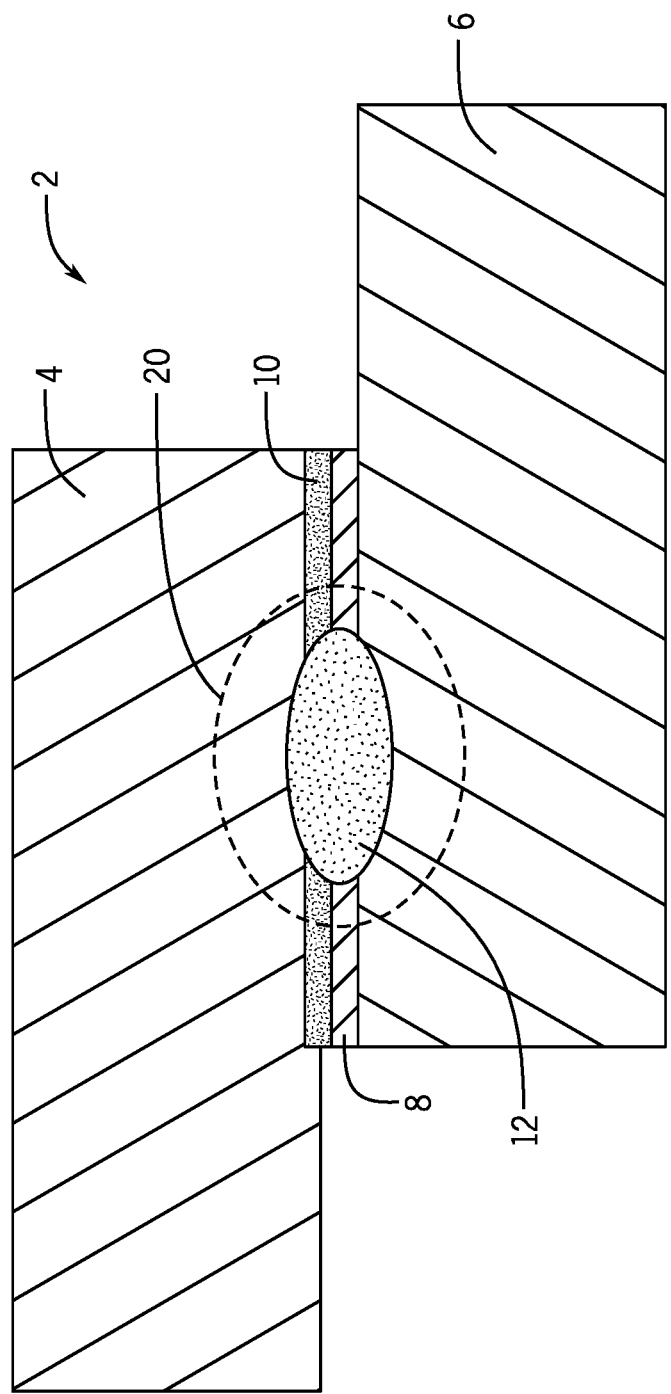
FIG. 1 is a cross-sectional view of a welded assembly including a resistance spot weld and a single-layer transition material in accordance with the present subject matter.

Referring now to FIGS. 1-4, a welded assembly 2 includes a first component 4 comprising a first metal material, a second component 6 comprising a second metal material that is dissimilar to (i.e. different from) the first metal material, and a transition material 8 arranged between the first and second components 4, 6 and comprising a high entropy alloy, pure element, or alloy sufficiently compatible with the first material and second material. The transition material 8 is ultrasonically welded to the first component 4 via a process such as ultrasonic additive manufacturing ("UAM") to create a solid-state interface (i.e. UAM weld or ultrasonic weld 10) between the first component 4 and the transition material 8, wherein the UAM weld 10 includes a portion of the first component 4 and the transition material 8.

UAM is a solid-state (i.e. no melting) metal welding process based on ultrasonic metal welding, which provides fully dense, gapless three dimensional parts. In the ultrasonic welding process, an ultrasonic welder may be used, which includes a sonotrode (i.e. horn) driven by one or more piezoelectric transducers to impart ultrasonic vibrations under a compressive force to a metal part to be joined. The sonotrode operates at a vibration frequency typically about 20 kHz or 40 kHz (nominal) that is transverse to the metal part to create plastic deformation between the metal part and the material to which it is being welded. When two metal parts are being ultrasonically welded, vibrations imparted by the sonotrode on the workpiece along with a static compressive force cause a metallurgical bond to form between the two metal parts. Process temperatures are low, typically below 150° C., and thus inhibit the formation of brittle IMCs, inhibit altering the microstructure of the bulk of the joined metals, and inhibit heat-induced distortion or property degradation of the joined metals.

Ultrasonic welding is useful for joining the transition material 8 to the first component 4 because it is a low temperature process—meaning that it may not alter the effect of prior heat treatments or the microstructure of the first component 4 on a meso- or macro-scale, and is able to join dissimilar metal materials without formation of adverse IMCs. Second, ultrasonic welding produces a continuous hermetic bond between the first component 4 and the transition material 8, such that the interface between the bonded structures can be isolated from the exterior environment thereby avoiding corrosion or infiltration by contaminants such as an electrolyte.

Further, UAM is a solid state process that requires no other material to form the ultrasonic weld 10. The UAM process thus results in the absence of any contaminants that would be in the weld pool if an adhesive or other substance is used to maintain the location of the transition material 8 relative to the first component 4. Ultrasonic welding the transition material 8 to first component 4 allows the transition material 8 to be maintained at a desired location on the first component 4 by preventing movement of the transition material 8 with respect to the first component 4. This allows the first component 4 and the transition material 8 to be transported, for example, from one location (e.g. a supplier) to another location (e.g. a vehicle assembly line) while keeping the transition material 8 at a desired location on the first component 4 for later fusion welding with the second component 6. The UAM weld 10 is strong and durable, thus allowing the transition material 8 to be welded to the first component 4 at a separate time and place from the act of joining the first component 4 to the second component 6.

After UAM welding the transition material 8 to the first component 4, the first and second components 4, 6 are then arranged so that the transition material is sandwiched between the two components 4, 6, e.g. contacting the two components 4, 6. The first and second components 4, 6 can then be welded together by traditional resistance spot welding or any typical fusion welding method. Fusion welding creates a fusion weld 12 (e.g. a resistance spot weld), and also produces a heat affected zone 20 surrounding the fusion weld 12.

Fusion welding is performed so as to form a fusion weld 12 that, exclusive of the heat affected zone 20, consumes (i.e. contacts) a portion the first component 4, a portion of the second component 6, and a portion of the transition material 8. As depicted, the fusion weld 12, exclusive of the heat affected zone 20, extends through the entire thickness of the transition material 8, through the UAM weld 10, and contacts the first component 4 and the second component 6.

The welding method used to create the fusion weld 12, or "weld nugget," between the first and second components 4, 6 may include any known fusion welding method, including but not limited to, resistance spot welding (RSW), arc welding, radiation welding (e.g. laser welding), conduction welding, induction welding, flame contact welding, and solid reactant welding. After welding, the fusion weld 12 contains a portion of both of the first and second components 4, 6, as well as a part of the transition material 8. In other words, the fusion weld 12 contact the first component 4, the second component 6, and the transition material 8 and contains the first metal material, the second metal material, and a portion of the transition material 8.

Figure 2:
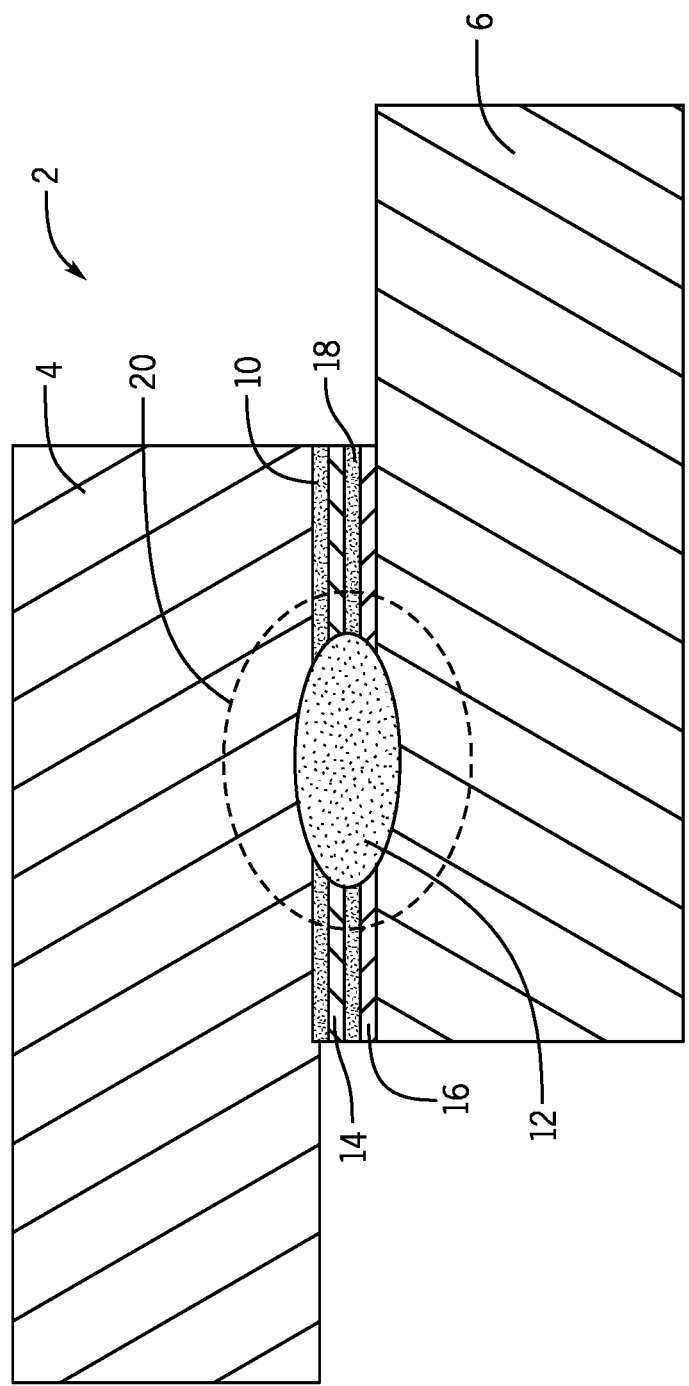
FIG. 2 is a cross-sectional view of a welded assembly including a resistance spot weld and a multi-layer transition material in accordance with the present subject matter.
Figure 3:
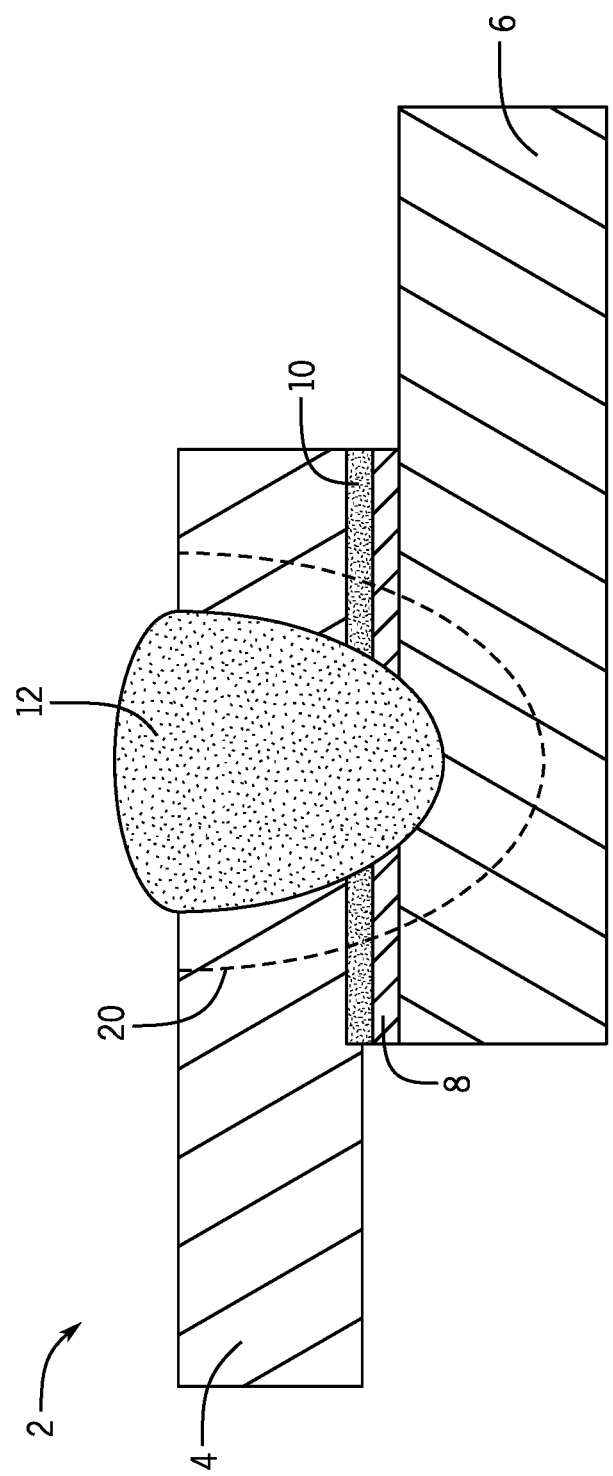
FIG. 3 is a cross-sectional view of still a welded assembly including a fusion weld other than a resistance spot weld, and a single-layer transition material in accordance with the present subject matter.
Figure 4:
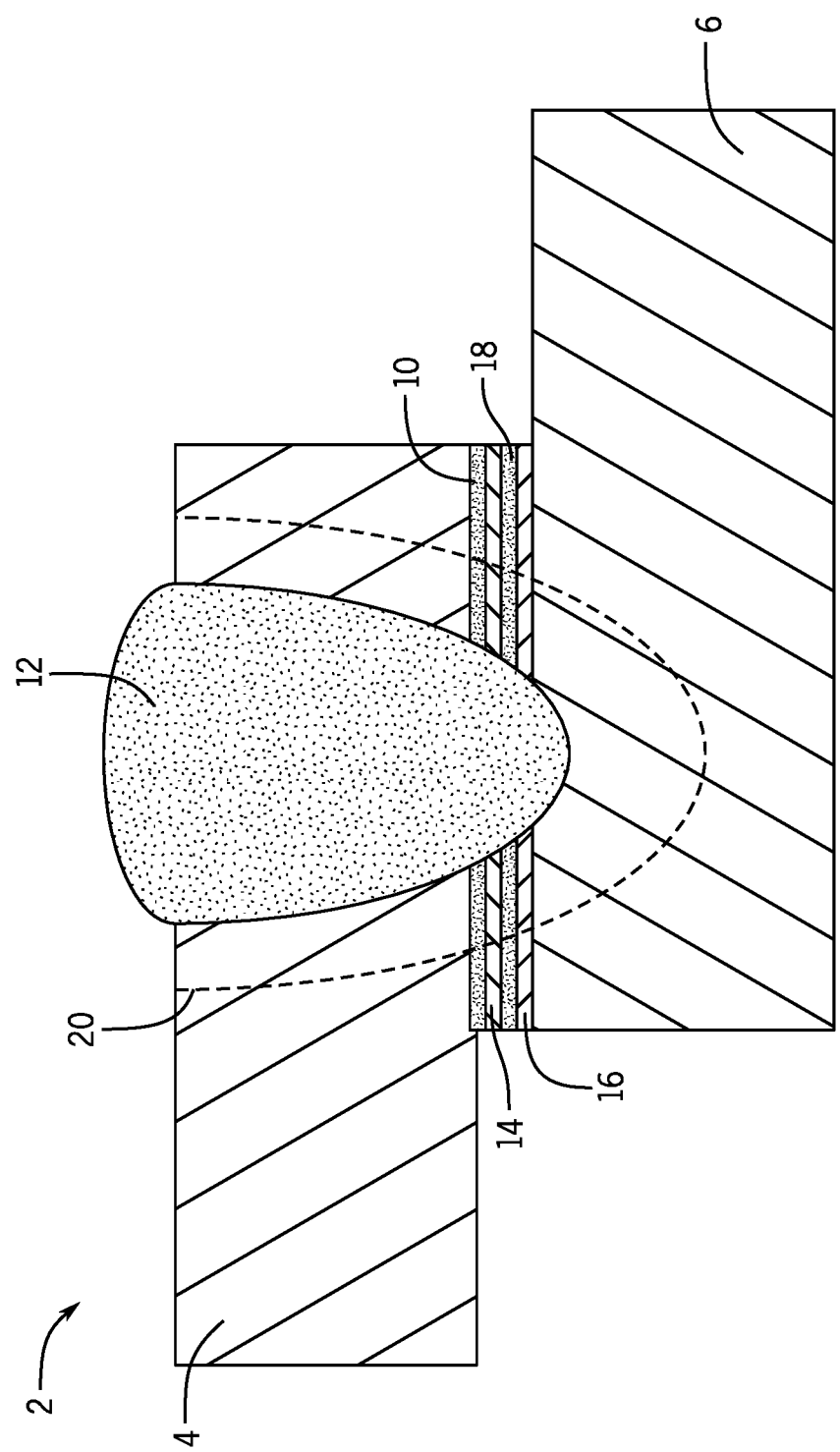
FIG. 4 is a cross-sectional view of a welded assembly including a fusion weld other than a resistance spot weld, and a multi-layer transition material in accordance with the present subject matter.

As depicted in FIGS. 1 and 2, the fusion weld 12 is confined to a central location between the first and second components 4, 6 (which may be typical of a resistance spot weld), and extends through the thickness (i.e. up and down in the figures) and contacts the first component 4 and the second component 6. Such fusion weld 12 may be a resistance spot weld formed by resistance spot welding. As depicted in FIGS. 3 and 4, the fusion weld 12 is not centrally located between the first and second components 4, 6 as in FIGS. 1 and 2, but instead consumes more of the first component 4 than the second component 6, and extends from one side (i.e. top in the figures) of the first component 4, towards and through the transition material 8, and extends into the second component 6 (which may be typical of a fusion weld other than resistance spot weld). As will be appreciated, the fusion weld 12 can alternatively consume more of the second component 6 than the first component 4, and extend from one side (i.e. bottom in the figures) of the second component 6, towards and through the transition material 8, and into the first component 4. Such fusion welds 12 depicted in FIGS. 3 and 4 may be formed by a fusion welding technique other than resistance spot welding, such as arc welding, radiation welding (e.g. laser welding), conduction welding, induction welding, flame contact welding, and solid reactant welding.

As indicated, the fusion weld 12 may be formed at a remote time and location from the formation of the UAM weld 10. For example, a parts supplier may form the UAM weld 10 between the first component 4 and the transition material 8 at the supplier's production facility, and then ship this part to a car manufacturer's production facility, which is remote in location from the supplier's production facility. The part, including the transition material 8 UAM welded to the first component 4, can be joined by fusion welding the second component 6 to the part at the car manufacturer's production facility at a time remote from the formation of the UAM weld 10. This arrangement allows for the production of the welded assembly 2, without requiring the car manufacturer's facility to be modified or upgraded to allow for UAM welding. The UAM welding being performed off-site at the supplier's production facility, allows the car manufacturer to save time and money that would otherwise be necessary to upgrade the production facility to allow for UAM welding.

In several embodiments, the first component 4 and the second component 6 are made from dissimilar materials (e.g. materials having different electrode potentials). However, this is not required, and the first and second components 4, 6 may be made of the same material. In several embodiments, the first component 4 comprises or consists of a first metal material, and the second component 6 comprises or consists of a second metal material that is different from the first metal material. In a non-limiting embodiment, one of the first and second metal materials includes or consists of aluminum or an aluminum-based alloy, and the other of the first and second metal materials includes or consists of steel or a steel-based alloy. In one aspect, the first metal material includes or consists of aluminum or an aluminum-based alloy, and the second metal material includes or consists of steel or a steel-based alloy. In another aspect, the first metal material includes or consists of steel or a steel-based alloy, and the second metal material includes or consists of aluminum or an aluminum-based alloy.

As depicted, the first component 4 does not contact the second component 6, and is instead separated by the transition material 8, wherein the transition material 8 contacts the first component 4 and contacts the second component 6.

When the first and second components 4, 6 are made of dissimilar materials (e.g. aluminum and steel), this isolation of and increased distance between the first component 4 from the second components 6 using the transition material 8 inhibits corrosion (e.g. galvanic corrosion between aluminum and steel) that could otherwise result if there was contact between the dissimilar metals.

In one embodiment, the transition material 8 is joined to the second component 6 only by the fusion weld 12. That is, the transition material 8 is not UAM welded to the second component 6. In another embodiment, the transition material 8 may be UAM welded to the second component 6 and the first component 4, e.g. before fusion welding the first component 4 to the second component 6.

The transition material 8 can be selected so as to be compatible with the first material and the second material. By "compatible," it is meant that the transition material inhibits one or more of galvanic corrosion, the formation of IMCs, and solidification cracking when the assembly 2 is fusion welded. The transition material 8 can be a single material such as a high entropy alloy, a traditional alloy (an alloy that is not a high entropy alloy), or a pure element such as a metal. By choosing an appropriate transition material 8 that is compatible with the first material and the second material, the elemental composition of the weld pool can be sufficiently diluted such that one or more of galvanic corrosion, the formation of adverse IMCs, or solidification cracking is suppressed below a critical level, or eliminated by the formation of energetically preferential compounds. The transition material 8 (i.e. high entropy alloy, a traditional alloy, or a pure element) may be considered compatible if upon fusion welding, the transition material 8 results in a reduced amount or level of one or more of galvanic corrosion, the formation of IMCs, and solidification cracking in the fusion weld, as compared to fusion welding the first component 4 directly to the second component 6 without having the transition material 8 arranged therebetween and contacting the first component 4 and the second component 6.

In steel-aluminum welds, these single materials used in the transition material 8 may be, or may contain, elements such as vanadium, niobium, silicon, magnesium, beryllium, copper, zinc, nickel, or rare-earth elements. The transition material 8 may consist of elements that serve as barriers to element diffusion and mixing (i.e. diffusion barrier) between the first and second components 4, 6. Such barrier elements may include vanadium or tantalum in steel-titanium welds, and silicon in steel-aluminum welds. In some embodiments, as a portion of the transition material 8 is consumed during fusion welding, the transition material 8 dilutes the weld pool with material (e.g. additional elements not present in the first or second components) or acts as a diffusion barrier, which thereby inhibits one or more of galvanic corrosion, the formation of IMCs, and solidification cracking in the fusion weld 12. In other embodiments, the diluting or barrier material is present in at least one of the first and second components 4, 6. The fusion weld 12 can comprise elements or compounds from the first component 4 (i.e. the first metal material), the second component 6 (i.e. the second metal material), and the transition material 8 (i.e. high entropy alloy). For fusion welds formed between steel and aluminum, the transition material 8 may include silicon, magnesium, beryllium, copper, zinc, nickel, or rare-earth metals. For fusion welds formed between steel and titanium, the transition material 8 may include vanadium or tantalum.

In this invention, the transition material 8 can be a single material such as a high entropy alloy. High-entropy alloys (HEAs) are metallic alloys that include five or more principal elements in approximately equiatomic ratio, with atomic concentration of each element varying from 5 to 35 atomic percent. HEAs may be used to maximize the configurational entropy and suppress one or more of galvanic corrosion, the formation of IMCs, and solidification cracking in the fusion weld 12 during or after fusion welding. In a non-limiting embodiment, the transition material 8 includes a HEA system of $Al_x$CoCrFeNi (x=0.1 to 0.3). Use of this, or other HEAs may result in the formation of a solid solution, instead of IMCs, in the fusion weld 12.

When $Al_x$CoCrFeNi (x=0.1 to 0.3) as used as transition material 8 between steel and aluminum first and second components 4, 6, the interfacial microstructures of the fusion weld 12 may contain a large iron (Fe) diffusion between the steel component and the HEA, thus forming a strong bond; and may contain silicon oxidation at the interface between the aluminum and the HEA. Moreover, the strength of the joint may increase as the welding time increases.

The transition material 8 can also comprise a pure element, such as nickel. When nickel is used as a transition layer 8 between steel and titanium or a titanium-based alloy for the first and second component 4, 6, the presence of nickel may sufficiently dilute the weld pool to prevent the formation of brittle Fe—Ti IMCs and/or solidification cracking, which typically cause welds between ferrous and titanium pieces to fail.

The transition material 8 can also comprise an alloy that is not a high entropy alloy, and that is similar to one of the base metals but with the addition or omission of specific alloying elements. As an example, an Al alloy with the addition of zinc can reduce the thickness of an IMC layer and/or solidification cracking below critical values when welding to steel. An Al alloy with the addition of silicon can similarly reduce or eliminate the IMC layer solidification cracking, in addition to reducing the hardness of the transition zone between the Al base metal and steel base metal.

The transition material 8 may comprise a single-layer or multi-layer structure. A single-layer transition material 8 is depicted for example in FIGS. 1 and 3. A multi-layer transition material 8 is depicted for example, in FIGS. 2 and 4.

The multi-layer transition material 8 (FIGS. 2 and 4) may include multiple layers of varying compositions, so that the composition of the transition material 8 changes from a side closest to the first component 4 to a side closest to the second component 6. In the embodiments depicted in FIGS. 2 and 4, the various layers of the transition material 8 may be joined together, such as by solid state welding techniques like UAM, or by roll bonding, diffusion welding, clad welding, or sputtering of the various layers. Joining of the layers of the transition material 8 may be performed before the fusion welding of the assembly 2.

As depicted in FIGS. 2 and 4, the transition material 8 includes a first layer 14 and a second layer 16. The first layer 14 may be bonded to the second layer 16 other than by the fusion weld 12, for example by a UAM joint 18 that is formed by ultrasonic welding the first layer 14 to the second layer 16. The first layer 14 is arranged closest to, and contacting the first component 4. The first layer 14 is also bonded by ultrasonic weld 10 to the first component 4. The second layer 16 is arranged closest to, and contacting the second component 6, but is not bonded to the second component 6 other than by the fusion weld 12. The transition material 8 can include additional layers, for example a third layer, a fourth layer, etc.

The transition material 8 may have a gradient or otherwise variable or changing composition as it goes from interfacing the first component 4 to interfacing the second component 6. Such gradient composition may be used in order to place a particular composition closer to a first or second component 4, 6 with which it is more compatible (i.e. results in less of one or more of galvanic corrosion, IMCs, and solidification cracking in the fusion weld 12). In FIGS. 2 and 4 for example, the first layer 14 may be more compatible with the first material of the first component 4 and the second layer 16 may be more compatible with the second material of the second component 6, such that the fusion weld 12 contains less of one or more of galvanic corrosion, intermetallic compounds, and solidification cracking than if the second layer 16 was arranged closest to the first component 4 and the first layer 14 was arranged closest to the second component 6.

In an embodiment, the first layer 14 comprises a silicon-containing Al alloy compatible with an Al base metal 4. In an embodiment, the second layer 16 comprises zinc or a zinc-containing alloy compatible with a steel base metal 6.

The present subject matter includes a method of making a welded assembly 2 by providing a transition material 8 ultrasonically welded to the first component 4. In an embodiment, the method includes ultrasonic welding the transition material 8 to the first component 4. In this embodiment, the transition material 8 may be brought into contact with the first component 4 and then ultrasonically welded to the first component 4 at a predetermined location on the first component 4. The arrangement and bonding of the transition material 8 at the predetermined location allows the first component 4 to optionally be transported or stored, and then later fusion welded to the second component 6 through the transition material 8 in order to form an assembly 2 having a desired configuration.

After the transition material 8 is ultrasonically welded to the first component 4, the transition material 8 is then arranged between the first component 4 and a second component 6 such that the transition material 8 contacts the second component 6. The first component 4 (and also the transition material 8) is joined to the second component 6 by fusion welding through the transition material 8 in order to form a fusion weld 12 between the first component 4 (and through the transition material 8) and the second component 6.

Fusion welding is conducted such that the fusion weld 12 passes through the transition material 8 to contact the first component 4 and the second component 6. In other words, the fusion weld 12 consumes a portion of the first component 4, a portion of the transition material 8, and a portion of the second component 6. In this way, the fusion weld 12 contain material from the first component 4, the second component 6, and the transition material 8. The transition material 8, in several embodiments, comprising a high entropy alloy that inhibits the formation of IMCs galvanic corrosion, and/or solidification cracking in the fusion weld 12 that would otherwise form during or after fusion welding together dissimilar materials of the first metal material and the second metal material.

When the transition material 8 is a multilayer structure (FIGS. 2 and 4), the method further comprises welding together the layers of the multi-layer transition material 8, including the first layer 14 and the second layer 16, at their interfaces. Welding together the first and second layers 14, 16, and other layers of the multi-layer transition material 8 if present, may be conducted before ultrasonic welding the transition material 8 to a first component 4, and before fusion welding the first component 4 to the second component 6. In another embodiment, the layers of the multi-layer transition material 8 may instead be sequentially ultrasonically welded to the first component 4 one layer at a time. In this embodiment, the first layer 14 may be ultrasonically welded to the first component 4 thereby forming the UAM weld 10, and then the second layer 16 may be ultrasonically welded to the first layer 14 thereby forming the UAM joint 18. In still another embodiment (not shown), the layers of the multi-layer transition material 8 may be first ultrasonically welded independently to the respective first component 4 and second component 6. In this embodiment, the first layer 14 may be ultrasonically welded to the first component 4, and the second layer 16 may be ultrasonically welded to the second component 6. Thereafter, the first layer 14 and second layer 16 are brought into contact with each other and fusion welded together to thereby fusion weld the first component 4 to the second component 6.

The welded assembly 2 formed by the described method may be used as a vehicle component or portion thereof, for example as a frame member, panel member, or other component of a vehicle. Because the transition material 8 can be ultrasonically welded to the first component 4 at a time and location remote from the first and second components 4, 6 being fusion welded together, it is possible for the welded assembly 2 to be produced through known vehicle assembly lines without any requirement for re-tooling or additional capital investment to provide UAM capabilities. The welded assembly can be mounted as part of a vehicle, and optionally e-coated and subjected to painting processes, including curing or baking paint that has been applied to the welded assembly 2.

Further, the welded assembly 2 can include more than one fusion weld 12, for example two or more fusion weld that, exclusive of a heat affected zone 20, consume a portion of each of the first component 4, the transition material 8, and the second component 6. It will also be appreciated that the fusion weld 12 can comprise a different shape or size than shown in the figures, and can be a spot weld, a seam weld, or other type of weld. Further, the arrangement of the first and second components 4, 6 are depicted in the figures to form a lap joint However, the present subject matter is not limited to this arrangement, and includes other arrangements for the first and second components 4, 6 so as to form for example, butt joints, T-joints, flange joints, etc. Additionally, other components can be welded to the first or second components 4, 6 using an additional weld or using the fusion weld 12, such as the fusion weld 12 depicted in FIGS. 3 and 4.

The present subject matter allows for the joining of dissimilar metals using conventional fusion welding techniques such that the fusion weld 12 contacts both the first and second components 4, 6, while avoiding the formation of detrimental IMCs galvanic corrosion, and/or solidification cracking in the fusion weld 12, thereby producing strong and durable welded joints between dissimilar materials.

It will be appreciated that variations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A welded assembly comprising:
   a first component including a first metal material,
   a second component including a second metal material,
   a transition material arranged between and contacting the first component and the second component, the transition material comprising one or more of a high entropy alloy, a pure element, and an alloy that is not a high entropy alloy,
   an ultrasonic weld joining the transition material to the first component, and
   a fusion weld extending through the ultrasonic weld and the transition material, and joining the first component to the second component;
   wherein the fusion weld contacts the first component, the second component, and the transition material;
   wherein the ultrasonic weld, the fusion weld, and the transition material are different portions of the welded assembly.

2. The welded assembly according to claim 1, wherein the first metal material has the same composition as the second metal material.

3. The welded assembly according to claim 1, wherein:
   the transition material is ultrasonically welded to the second component; and
   the first component does not contact the second component.

4. The welded assembly according to claim 1, wherein the welded assembly is a vehicle assembly.

5. The welded assembly according to claim 1, wherein the fusion weld is a resistance spot weld, an arc weld, a laser weld, a conduction weld, an induction weld, a flame contact weld, or a solid reactant weld.

6. The welded assembly according to claim 1, wherein:
   the high entropy alloy is $Al_xCoCrFeNi$, where x=0.1 to 0.3;
   the pure element is nickel; and
   the alloy that is not a high entropy alloy is an aluminum alloy including zinc or silicon.

7. The welded assembly according to claim 1, wherein:
   the first metal material comprises aluminum; and
   the second metal material comprises steel and has a different composition than the first metal material.

8. The welded assembly according to claim 7, wherein:
   the transition material is a multi-layer structure including at least a first layer and a second layer;
   the first layer is arranged closest to the first component and comprises a silicon-containing aluminum alloy; and
   the second layer is arranged closest to the second component and comprises zinc or a zinc-containing alloy.

9. The welded assembly according to claim 8, wherein layers of the multi-layer structure, including the first layer and the second layer, are themselves welded together at their interfaces other than by the fusion weld.

10. The welded assembly according to claim 1, wherein the transition material is joined to the second component only by the fusion weld.

11. A method of making a welded assembly, comprising:
    providing a first component, a second component, and a transition material arranged between and contacting the first component and the second component, the transition material being ultrasonically welded to the first component by an ultrasonic weld; and
    forming a fusion weld between the first component and the second component to thereby make the welded assembly, the fusion weld extending through the ultrasonic weld and the transition material, and contacting the first component, the second component, and the transition material;
    wherein the first component comprises a first metal material,
    wherein the second component comprises a second metal material, and
    wherein the transition material comprises one or more of a high entropy alloy, a pure element, and an alloy that is not a high entropy alloy.

12. The method according to claim 11, wherein the first metal material has the same composition as the second metal material.

13. The method according to claim 11, wherein:
    the transition material is ultrasonically welded to the second component; and
    the first component does not contact the second component in the welded assembly.

14. The method according to claim 11, wherein the welded assembly is a vehicle assembly.

15. The method according to claim 11, wherein the fusion weld is a resistance spot weld, an arc weld, a laser weld, a conduction weld, an induction weld, a flame contact weld, or a solid reactant weld.

16. The method according to claim 11, wherein:
    the high entropy alloy is $Al_xCoCrFeNi$, where x=0.1 to 0.3;
    the pure element is nickel; and
    the alloy that is not a high entropy alloy is an aluminum alloy including zinc or silicon.

17. The method according to claim 11, wherein:
    the first metal material comprises aluminum; and
    the second metal material comprises steel and has a different composition than the first metal material.

18. The method according to claim 17, wherein:
    the transition material comprises a multi-layer structure including at least a first layer and a second layer;
    the first layer is arranged closest to the first component and comprises a silicon-containing aluminum alloy; and
    the second layer is arranged closest to the second component and comprises zinc or a zinc-containing alloy.

19. The method according to claim 18, wherein layers of the multi-layer structure, including the first layer and the second layer, are themselves welded together at their interfaces other than by the fusion weld.

20. The method according to claim 11, wherein the transition material is joined to the second component only by the fusion weld.

* * * * *